US006773566B2

(12) United States Patent
Shenderov

(10) Patent No.: US 6,773,566 B2
(45) Date of Patent: Aug. 10, 2004

(54) ELECTROSTATIC ACTUATORS FOR MICROFLUIDICS AND METHODS FOR USING SAME

(75) Inventor: Alexander Shenderov, Raleigh, NC (US)

(73) Assignee: Nanolytics, Inc., Raleigh, NC (US)

(*) Notice: Subject to any disclaimer, the term of this patent is extended or adjusted under 35 U.S.C. 154(b) by 437 days.

(21) Appl. No.: 09/943,675

(22) Filed: Aug. 30, 2001

(65) Prior Publication Data

US 2002/0043463 A1 Apr. 18, 2002

Related U.S. Application Data

(60) Provisional application No. 60/229,420, filed on Aug. 31, 2000.

(51) Int. Cl.[7] ................................................ G01N 27/26

(52) U.S. Cl. ....................................... 204/450; 204/600

(58) Field of Search .................................. 204/450, 600

(56) References Cited

U.S. PATENT DOCUMENTS 4,418,346 A 11/1983 Batchelder
4,636,785 A 1/1987 Le Pesant
5,181,016 A 1/1993 Lee
5,731,792 A 3/1998 Sheridon
6,565,727 B1 * 5/2003 Shenderov .................. 204/600

* cited by examiner

*Primary Examiner*—Arun S. Phasge
(74) *Attorney, Agent, or Firm*—Myers Bigel Sibley & Sajovec

(57) ABSTRACT

An apparatus for inducing movement of an electrolytic droplet includes: a housing having an internal volume filled with a liquid immiscible with an electrolytic droplet; a distribution plate positioned within the chamber having an aperture and dividing the housing into upper and lower chambers; a lower electrode positioned below the lower chamber and the aperture in the distribution plate and being separated from the lower chamber by an overlying hydrophobic insulative layer; an upper electrode located above the upper chamber and the aperture of the distribution plate and being separated from the upper chamber by an underlying hydrophobic insulative layer; and first, second and third voltage generators that are electrically connected to, respectively, the lower and upper electrodes and the distribution plate. The voltage generators are configured to apply electrical potentials to the lower and upper electrodes and the distribution plate, thereby inducing movement of the electrolytic droplet between the hydrophobic layers.

22 Claims, 4 Drawing Sheets

ELECTROSTATIC ACTUATORS FOR MICROFLUIDICS AND METHODS FOR USING SAME

CROSS-REFERENCE TO RELATED APPLICATION

The present application claims priority from U.S. Provisional Patent Application Serial No. 60/229,420, filed Aug. 31, 2000 the disclosure of which is hereby incorporated herein in its entirety.

FIELD OF THE INVENTION

The present invention relates generally to biochemical assays, and more particularly to biochemical assays conducted through electrowetting techniques.

BACKGROUND OF THE INVENTION

Typically, biochemical assays (such as those performed in drug research, DNA diagnostics, clinical diagnostics, and proteomics) are performed in small volume (50–200 $\mu$L) wells. Multiple wells are ordinarily provided in well plates (often in groups of 96 or 384 wells per plate). In additional to the bulk of the wells themselves, the reaction volumes can require significant infrastructure for generating, storing and disposing of reagents and labware. Additional problems presented by typical assay performance include evaporation of reagents or test samples, the presence of air bubbles in the assay solution, lengthy incubation times, and the potential instability of reagents.

Techniques for reducing or miniaturizing bioassay volume have been proposed in order to address many of the difficulties set forth hereinabove. Two currently proposed techniques are ink jetting and electromigration in capillary channels (these include electroosmosis, electrophoresis, and combinations thereof). Ink jetting involves the dispensing of droplets of liquid through a nozzle onto a bioassay substrate. However, with ink jetting it can be difficult to dispense precise volumes of liquid, and this technique fails to provide a manner of manipulating the position of a droplet after dispensing. Electromigration involves the passage of electric current through a liquid sample. The transmission of the electric current can tend to separate ions within the solution; while for some reactions this may be desirable, for others it is not. Also, the passage of current can heat the liquid, which can cause boiling and/or the occurrence of undesirable chemical reactions therein.

An additional technique for performing very low volume bioassays that addresses at least some of the shortcomings of current techniques is electrowetting. In this process, a droplet of a polar conductive liquid (such as a polar electrolyte) is placed on a hydrophobic surface. Application of an electric potential across the liquid-solid interface reduces the contact angle between the droplet and the surface, thereby making the surface more hydrophilic. As a result, the surface tends to attract the droplet more than surrounding surfaces of the same hydrophobic material that are not subjected to an electric potential. This technique can be used to move droplets over a two-dimensional grid by selectively applying electrical potentials across adjacent surfaces. Exemplary electrowetting devices are described in detail in co-assigned and co-pending U.S. patent application Ser. No. 09/490,769, filed Jan. 24, 2000 now U.S. Pat. No. 6,565,727, the content of which is hereby incorporated herein in its entirety.

In view of the foregoing, it would be desirable to provide a technique for employing electrowetting processes that can enable a droplet to move in three-dimensions.

SUMMARY OF THE INVENTION

The present invention can enable droplets within an electrowetting device to move in three dimensions. As a first aspect, the present invention is directed to an apparatus for inducing movement of an electrolytic droplet comprising: a housing having an internal volume filled with a liquid immiscible with an electrolytic droplet; a distribution plate positioned within the chamber having an aperture therein, the distribution plate dividing the housing into upper and lower chambers; a lower electrode positioned below the lower chamber and below the aperture in the distribution plate, the lower electrode being electrically insulated from the lower chamber and being separated from the lower chamber by an overlying hydrophobic layer; an upper electrode located above the upper chamber and above the aperture of the distribution plate, the upper chamber electrode being electrically insulated from the upper chamber and being separated from the upper chamber by an underlying hydrophobic layer; and first, second and third voltage generators that are electrically connected to, respectively, the lower and upper electrodes and the distribution plate. The first, second and third second voltage generators are configured to apply electrical potentials to the lower and upper electrodes and to the distribution plate, thereby inducing movement of the electrolytic droplet between the hydrophobic layers of the upper and lower chambers.

With a device of this configuration, the device is capable of moving an electrolytic droplet outside of the two-dimensional plane typically defined by the lower chamber. As such, a droplet can be raised into contact with the hydrophobic layer of the upper chamber, which may be coated with a reactive substrate that reacts with constituents of the electrolytic droplet. Thus, reactions can be carried out in one location in the upper chamber as other droplets are free to move below the reacting droplet. Also, the upper chamber may include multiple sites of reactive substrate, which may be identical, may contain the same substrate in varied concentrations, or may contain different substrates. As such, the hydrophobic layer of the upper chamber may serve to identify and quantify constituents of the electrolytic droplet.

The device described above may be used in the following method, which is a second aspect of the present invention. The method comprises: providing a housing having an internal volume and a distribution plate residing therein, the distribution plate having an aperture and dividing the internal volume into upper and lower chambers, the lower chamber including an electrolytic droplet and each of the upper and lower chambers containing a liquid immiscible with the electrolytic droplet, the housing including a lower electrode electrically insulated from the lower chamber and underlying a hydrophobic layer, and the housing further including an upper electrode electrically insulated from the upper chamber and overlying a hydrophobic lower layer; positioning the electrolytic droplet above the lower electrode and beneath the distribution plate aperture; and applying electrical potentials to the lower and upper electrodes and to the distribution plate to draw the electrolytic droplet through the distribution plate aperture and to the upper chamber hydrophobic surface.

As a third aspect, the present invention is directed to an apparatus for inducing movement of an electrolytic droplet. The apparatus comprises: a housing having an internal volume; a plurality of adjacent, electrically isolated transport electrodes positioned in the housing, wherein sequential transport electrodes have substantially contiguous, hydrophobic surfaces, the transport electrodes defining a droplet travel path; a first voltage generator electrically connected to the transport electrodes, the first voltage generator configured to apply electrical potentials sequentially to each transport electrode along the droplet travel path, thereby inducing movement of an electrolytic droplet along the travel path; a plurality of gate electrodes, each of the gate electrodes positioned in the housing adjacent a respective transport electrode and having a hydrophobic surface that is substantially contiguous with the hydrophobic surface of the adjacent transport electrode, the gate electrodes being electrically connected; a second voltage generator connected to the plurality of gate electrodes and configured to apply electrical potentials thereto; a plurality of destination electrodes, each of which is positioned in the housing adjacent a respective gate electrode, each destination electrode having a hydrophobic surface that is substantially contiguous with the hydrophobic surface of the adjacent gate electrode; and a third voltage generator connected to the destination electrodes and configured to apply electrical potentials thereto. This configuration enables the device to "park" electrolytic droplets in the destination electrodes prior to, during or after processing while allowing other droplets to use the travel path defined by the transport electrodes.

DETAILED DESCRIPTION OF THE INVENTION

Figure 1A:
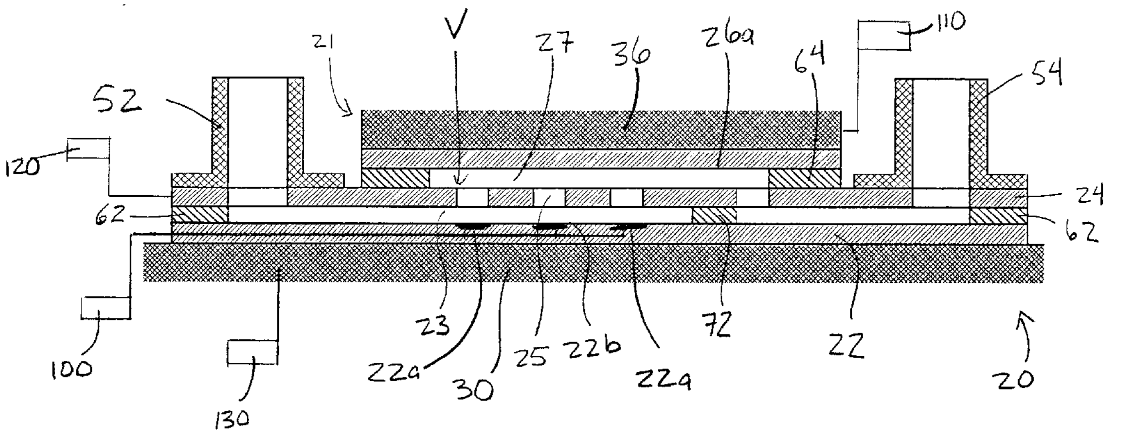
FIG. 1*a* is a side section view of an apparatus of the present invention.

The present invention will now be described more fully hereinafter, in which preferred embodiments of the invention are shown. This invention may, however, be embodied in different forms and should not be construed as limited to the embodiments set forth herein. Rather, these embodiments are provided so that this disclosure will be thorough and complete, and will fully convey the scope of the invention to those skilled in the art. In the drawings, like numbers refer to like elements throughout. Thicknesses and dimensions of some components may be exaggerated for clarity.

Figure 1B:
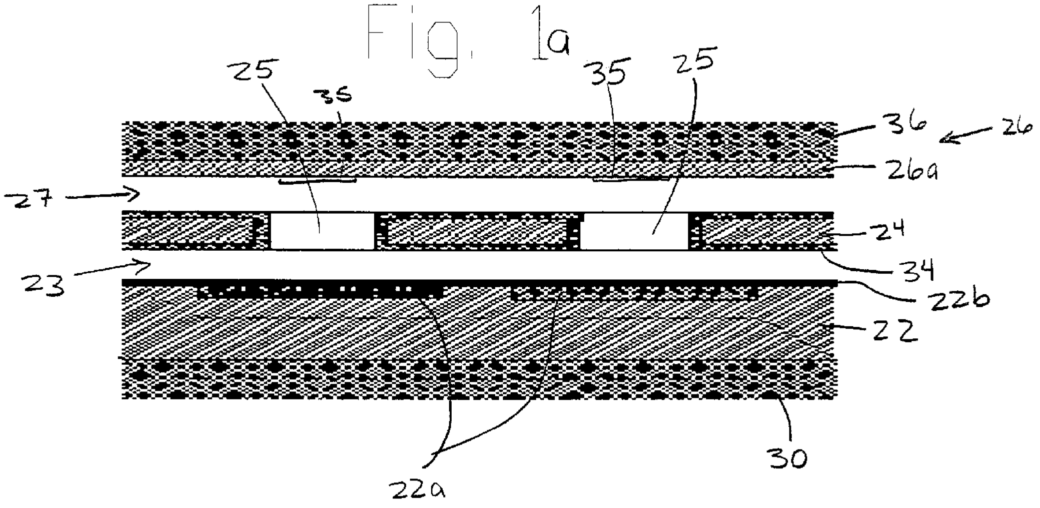
FIG. 1*b* is an enlarged side section view of the apparatus of FIG. 1*a*.

Turning now to the figures, an embodiment of an electrowetting apparatus for the movement of electrolytic droplets, designated broadly at 20, is depicted in FIGS. 1*a* and 1*b*. The device 20 includes a bottom plate 22, a gasket 62 and a distribution plate 24 that form a lower chamber 23. The distribution plate 24, a gasket 64 and a top plate 26 form an upper chamber 27. The bottom and top chambers 23, 27 are in fluid communication through apertures 25 in the distribution plate 24. The bottom plate 22, top plate 26, distribution plate 24, and gaskets 62, 64 form a housing 21 having an internal volume V, although those skilled in this art will recognize that other housing configurations may be suitable for use with the present invention. The skilled artisan will also recognize that the terms "upper" and "lower" are included in the description for clarity and brevity, and that the device 20 and the components therein may be oriented in any orientation (e.g., with the upper chamber 27 positioned below the lower chamber 23) and still be suitable for use with the present invention.

Figure 4:
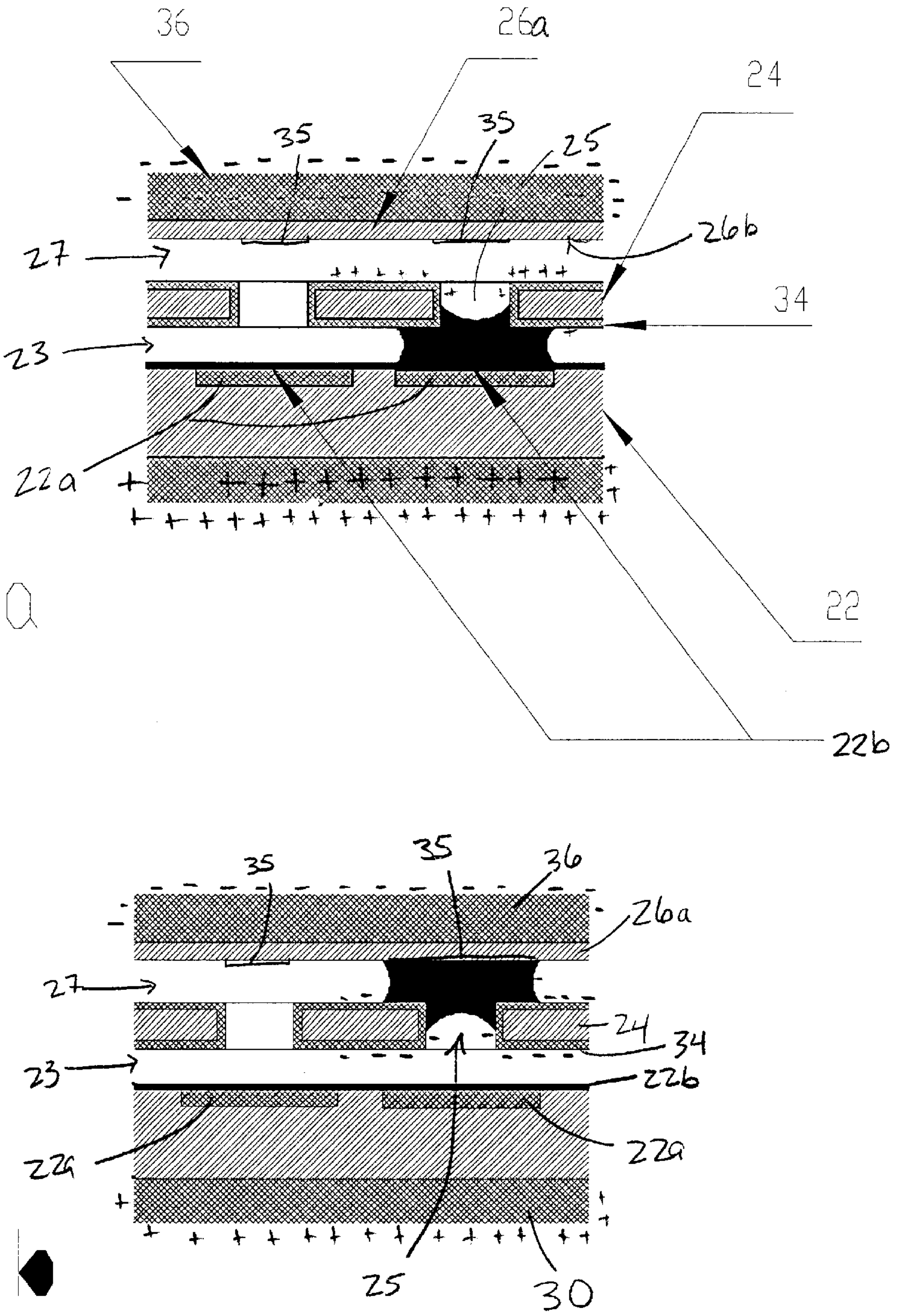
FIG. 4*a* is a partial side section view of the device of FIG. 1*a* showing an electrolytic droplet in the lower chamber in position beneath an aperture in the distribution plate.
FIG. 4*b* is a partial side view of the section of the device shown in FIG. 4*a* illustrating the movement of a droplet through a hole in the distribution plate to contact an electrode in the upper chamber.

Referring now to FIGS. 1*b*, 4*a* and 4*b*, the bottom plate 22 includes a plurality of electrically isolated droplet manipulation electrodes 22*a* that reside below the upper layer 22*b* of the bottom plate 22. A lower electrode 30 underlies the bottom plate 22. The droplet manipulation electrodes 22*a* can be arranged below the upper layer 22*b* in any configuration that enables an electrolytic droplet to be conveyed between individual electrodes; exemplary arrangements of droplet manipulation electrodes 22*a* are described below and in U.S. patent application Ser. No. 09/490,769 now U.S. Pat. No. 6,565,727. For example, the droplet manipulation electrodes 22*a* may be arranged side-by-side, and may have interdigitating projections one their adjacent edges. Typically, the droplet manipulation electrodes 22*a* are formed as a thin layer on the bottom plate 22 by sputtering or spraying a pattern of conductive material onto the bottom plate 22.

The upper layer 22*b* of the bottom plate 22 overlies the electrodes 22*a* and should be hydrophobic and electrically insulative; it can be hydrophobized in any manner known to those skilled in this art, such as by a suitable chemical modification (for example, silanization or covalent attachment of nonpolar polymer chains), or the application of a hydrophobic coating (for example, Teflon AF™ from DuPont, or CyTop™ from Asahi Glass). For the purposes of this discussion, reference to an electrolytic droplet being "positioned on", "in contact with", or the like, in relation to a droplet manipulation electrode, indicates that the electrolytic droplet is in contact with the hydrophobic layer that overlies that droplet manipulation electrode. It should also be recognized that the individual droplet manipulation electrodes 22*a* may be covered by individual hydrophobic layers. In any event, the hydrophobic surfaces of the electrodes 22*a* should be substantially or even entirely contiguous, such that electrolytic droplets can be conveyed from one droplet manipulation electrode 22*a* to an adjacent droplet manipulation electrode 22*a*.

Referring now to FIGS. 1, 4*a* and 4*b*, the top plate 26 includes at least one electrode 36 separated from the upper chamber 27 by a hydrophobic, electrically insulative lower layer 26*a*. The lower layer 26*a* is preferably detachable from the electrode 36 and/or formed of a transparent material, such as glass or plastic, to permit optical observation. The electrode 36 may be separate from the lower layer 26*a*, and the device 20 may include a component (such as a clamp) to press the electrode 36, lower layer 26*a* and the remaining assembly together. Alternatively, the electrode 36 may be integral to the component employed to press the device 20 together. In another embodiment, the electrode 36 comprises a conductive coating deposited on the upper surface of the lower layer 26*a,* in which case it is preferably made of a transparent conductive material such as indium tin oxide (ITO) or arsenic tin oxide (ATO). In another alternative embodiment, the electrode 36 is a transparent conductive coating between two layers of transparent insulators, such as glass and polymer film.

The lower surface 26*b* of the lower layer 26*a* may additionally be chemically modified to carry chemically reactive substrates that allow covalent attachment of a variety of molecules to the lower layer 26*a*. Some examples of such groups include epoxy, carboxy and amino groups, as well as polymers carrying those groups. Other examples of modifying components include a porous film or hydrogel, such as agarose, acrylamide or silica gel. This can have the effect of increasing the surface available for chemical modification. The polymer film or hydrogel may optionally be chemically modified to carry chemically reactive groups allowing covalent attachment of a variety of molecules to the surface. Examples of such groups include epoxy, carboxy and amino groups, as well as polymers carrying those groups. The density of reactive constituents on the lower surface 26*b* and of molecules rendering the surface hydrophobic may be varied in a controlled manner using known methods, such as chemical vapor deposition, wet chemical modification, plasma treatment, physical vapor deposition and the like.

Alternatively, a double-layered coating may be applied to the lower surface 26*b* of the lower layer 26*a* a dip coater in a one-step coating process. In order to do that, two immiscible solutions are introduced into the coating bath. The more dense solution of the bottom solution in the bath contains precursors of the hydrophobic coating, optionally diluted in a nonpolar solvent. The lighter solution on the top of the bath is based on a polar solvent, such as water or an alcohol. A bifunctional molecule containing a hydrophobic chain and a polar functional group, or plurality of these groups, is dissolved in one or both of these solutions prior to filling the coating bath. Such a molecule may be, for example, represented by 1H, 1H, 2H, 2H- Heptadecafluorodecyl acrylate or 1H, 1H, 2H, 2H -Heptadecafluorodecyl methacrylate, or their derivatives with a hydrophilic oligomer attached, such as a short-molecule polyethylene glycol. Upon filling the coating bath with the two solutions, the bifunctional molecules will tend to concentrate on the interface, with polar ends oriented toward the polar solvent on the top. As a substrate is pulled out of such bath, it is simultaneously coated with the precursor of the hydrophobic layer and the bifunctional molecules. Upon drying and baking the coating, the hydrophobic coating formed on the substrate will contain the bifunctional molecules preferentially deposited on the surface. The surface density of the attached bifunctional molecules can be controlled by adjusting the deposition parameters, such as the initial concentrations of the precursor and the bifunctional molecule, substrate withdrawal rate, choice of the polar and nonpolar solvents and temperature of the coating bath.

Referring still to FIGS. 4*a* and 4*b*, the lower surface 26*b* of the lower layer 26*a* may also have one or more reactive substrates attached to or coated thereon. The reactive substrates may be present to react or interact with constituents of an electrolytic droplet brought into contact with the reactive substrate. The reactive substrate may be arranged, as illustrated in FIG. 1*b,* in individual reaction sites 35, each of which is positioned above and in substantial vertical alignment with a respective distribution plate aperture 25 and a respective droplet manipulation electrode 22*a*. Exemplary reactive substrates that can be attached in specific locations on the lower surface 26*b* include antibodies, receptors, ligands, nucleic acids, polysaccharides, proteins, and other biomolecules.

Referring now to FIGS. 1, 4*a* and 4*b*, the distribution plate 24 includes at least one, and typically a plurality of, apertures 25 that fluidly connect the bottom and top chambers 23, 27. The distribution plate 24 is either formed of conductive material or has a conductive surface coating, optionally including the interiors of the apertures 25, such that electrodes 34 are formed thereon. Adaptor(s) 52 are affixed to the upper surface of the distribution plate 24 so that the central hole of the adaptor 52 provides an inlet with the interior of the bottom chamber 23. Adaptor(s) 54 are affixed to the distribution plate 24 in a similar manner, but a gasket 72 separates the part of the bottom chamber 23 to which the adaptor(s) 54 are affixed, and this part of the bottom chamber 23 communicates with the top chamber 27 through additional apertures 29 in the distribution plate 24.

FIG. 1*a* also illustrates four voltage generators 100, 110, 120, 130 that are electrically connected to, respectively, the droplet manipulation electrodes 22*a*, the upper electrode 36, the distribution plate electrodes 34, and the lower electrode 30. The voltage generators 100, 110, 120, 130 are configured to apply electrical potentials to individual electrodes 22*a*, 36, 34 to enable electrolytic droplets to move between adjacent electrodes. Those skilled in this art will recognize that the voltage generators 100, 110, 120, 130 can be separate units, or any or all of the voltage generators can be coincident units.

Figure 2:
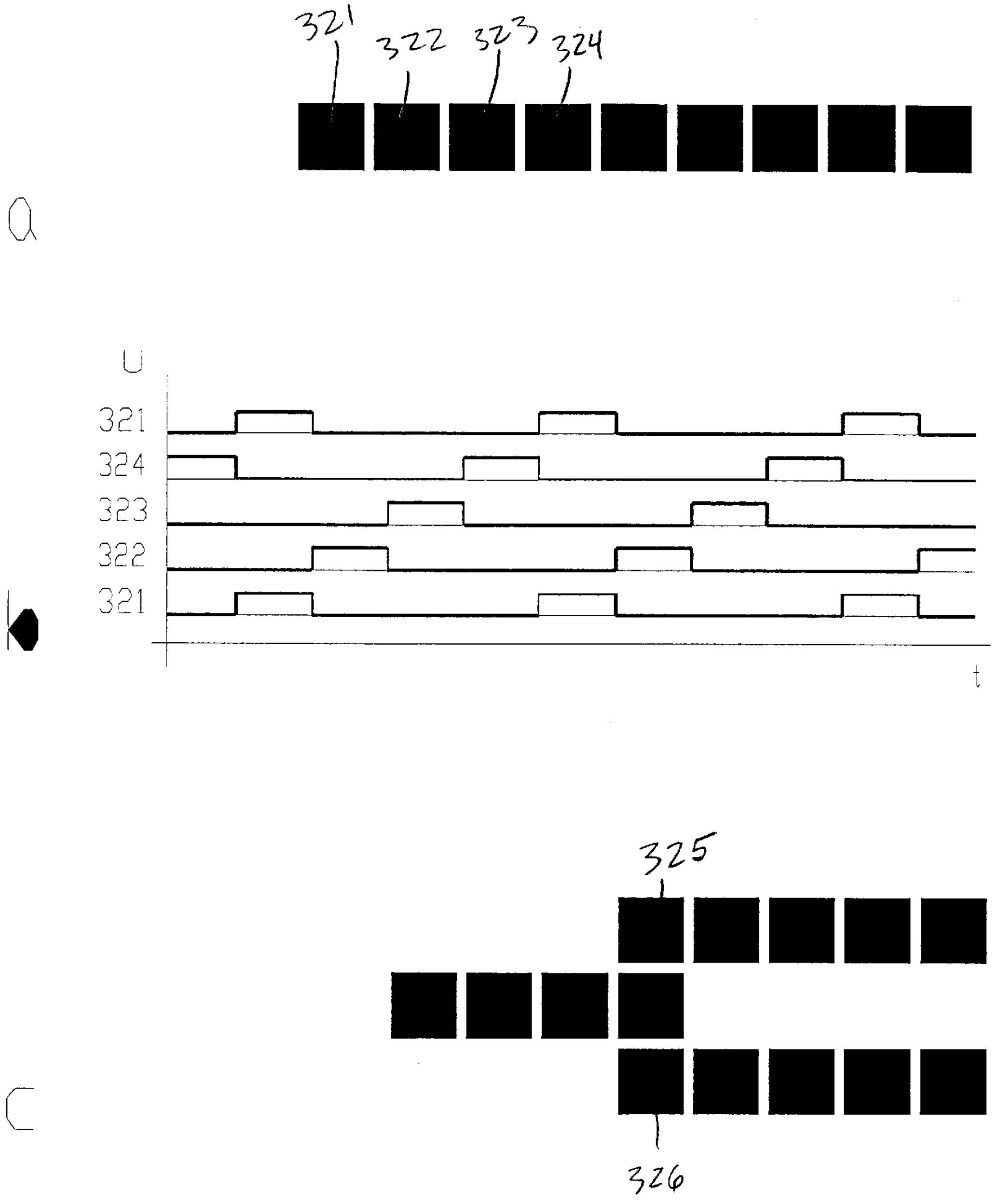
FIG. 2*a* is a top view of a series of sequential transport electrodes in the apparatus of FIG. 1*a*.
FIG. 2*b* is a graph indicating the time sequence for application of electrical potentials to the transport electrodes of FIG. 2*a*.
FIG. 2*c* is a top view of two sets of branching transport electrodes in the device of FIG. 1*a*.

While it is possible to form and move electrolytic droplets through electrowetting principles by individually controlling voltages on each droplet manipulation electrode 22*a*, it can require a very high number of off-chip electrical connections. Therefore, in one embodiment illustrated in FIG. 2*a*, there are dedicated droplet travel paths of droplet manipulation electrodes in which some "transport" electrodes (designated at 321, 322, 323, 324 in FIG. 2*a*) are connected in groups. Transport is effected by applying voltage sequentially to the transport electrodes; as an example, the voltage can be applied as a traveling wave to the transport electrodes 321, 322, 323 and 324, as shown in FIG. 2*b*. The travel paths may branch as needed, and at the divergence points bi-directional control valves, comprising valve electrodes 325 and 326, are used as shown in FIG. 2*c*. The valve electrodes 325, 326 are not typically electrically connected directly to any transport electrodes, but are controlled separately. For example, to effect a right turn in the arrangement shown in FIG. 2*c,* the valve electrode 325 remains grounded while the valve electrode 326 receives a voltage pulse synchronized with the appropriate phase of the traveling wave. A left turn can be achieved by controlling the valve electrodes 325 and 326 in the opposite manner.

Figure 3:
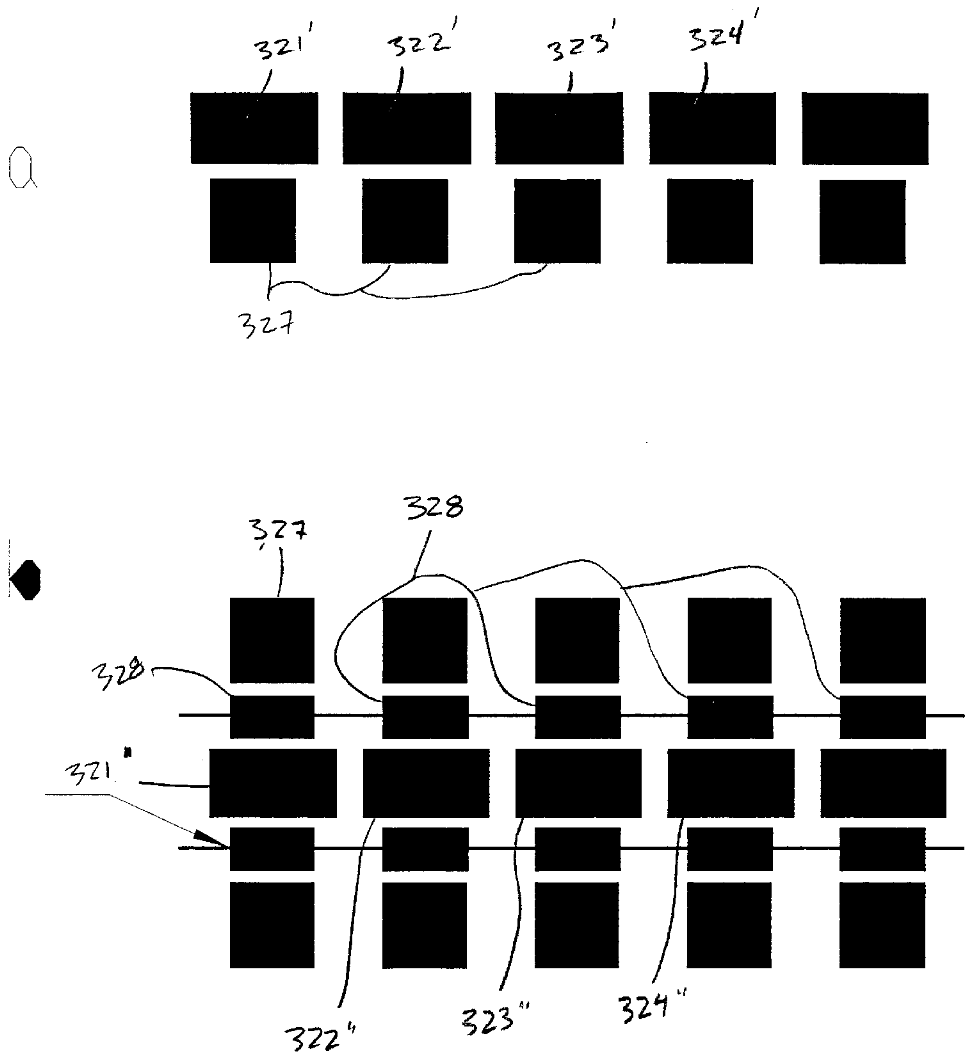
FIG. 3*a* is a top view of an electrode array having a plurality of transport electrodes and a plurality of destination electrodes.
FIG. 3*b* is a top view of an electrode array having a plurality of transport electrodes, a plurality of gate electrodes, and a plurality of destination electrodes.

FIGS. 3*a* and 3*b* illustrate two additional varieties of droplet manipulation electrodes. Destination electrodes 327, corresponding to the final positions of the droplets, may be arranged on either side or on both sides of the travel paths, with or without respective gate electrodes 328 (FIGS. 3*a* and 3*b*, respectively). It can be advantageous for the destination electrodes 327 to be separated from the travel paths formed by the transport electrodes 321', 322', 323', 324' in order to free up the travel paths while a droplet resides on and is acted upon at the destination electrode 327. The presence of the gate electrodes 328 illustrated in FIG. 3*b* can dissociate the transport electrodes 321", 322", 323", 324" from the destination electrodes 327', such that the application of an electrical potential to an destination electrode 327' does not impact a droplet on a transport electrode 324" (without the presence of the gate electrode 328, the application of an electrical potential to an destination electrode 327 can impact the electrical properties of the adjacent transport electrode 324, thereby precluding that transport electrode 324 from transporting droplets until the electrical potential of the destination electrode 327 is discontinued).

In some embodiments, all destination electrodes 327 on one side of a travel path may be grouped and electrically connected to be controlled simultaneously. Additionally, such groups adjacent to different travel paths may be further connected together. All gate electrodes 328 on one side of a travel path may be grouped and electrically connected to be controlled simultaneously. Additionally, such groups adjacent to different travel paths may be further connected together.

In operation, and referring to FIG. 1, the volume V of the housing 21 and the external fluid connections of the adaptors 52, 54 are partially or completely filled with an inert liquid immiscible with the electrolyte(s) to be manipulated in the device 20. Exemplary liquids include oils such as silicone oil (which can be fluorinated or even perfluorinated), benzene, or any other non-polar, preferably chemically inert liquid. Alternatively, the volume V may be filled with a gas, including air. Electrolyte droplets are formed and positioned within the bottom chamber 23 through an electrowetting dispenser, such as that described in U.S. patent application Ser. No. 09/490,769 referenced hereinabove now U.S. Pat. No. 6,565,727.

An electrolytic droplet can then be moved within the lower chamber 23 to a lower chamber electrode 22*a* positioned beneath an aperture 25 in the distribution plate 24. The droplet is moved by the sequential application of voltage with the voltage generator 100 to sequential, adjacent droplet manipulation electrodes 22*a*. This movement can be carried out by any of the techniques described above; typically, the droplet will travel along a travel path to a position adjacent an destination electrode, then will be conveyed to the destination electrode residing beneath the aperture 25. During such movement, typically the distribution plate electrode 34 is maintained in a ground state, as are the lower and upper electrodes 30, 36.

As a result of forming and manipulating the electrolytic droplet, it is positioned beneath a selected location (such as a reaction site 35) on the lower layer 26*a* of the top plate 26 (see FIG. 4*a*). The droplet can then be raised into contact with that location. Elevation of the droplet is effected by applying opposite electric potentials to the lower electrode 30 and the upper electrode 36 with the voltage generators 130, 110, then, with the voltage generator 120, biasing the distribution plate electrode 34 with the same charge as that of the lower electrode 30. This biasing causes the charged molecules within the droplet to repel the lower electrode 30 and be attracted to the upper electrode 36. This process can be reversed by applying oppositely charged electric potentials to the upper and lower electrodes 36, 30 and biasing the distribution plate electrode 34 with the same charge as that of the upper electrode 36.

Contact of the droplet to a selected location on the lower layer 26*a* of the top plate 26 enables constituents of the droplet to react with a reactive substrate at a reactive site 35 attached to the lower surface 26*b*. The reaction can be carried out until the droplet is returned to the lower chamber 23 as described above. Exemplary processes that can be carried out in the upper chamber 27 include binding of constituents in the electrolytic droplet, chemical modification of a molecule bound at the reactive site 35, and chemical synthesis between a constituent of the electrolytic droplet and the reactive substrate.

The foregoing is illustrative of the present invention, and is not to be construed as limiting thereof. Although exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

That which is claimed is:

1. An apparatus for inducing movement of an electrolytic droplet, comprising:

a housing having an internal volume filled with a liquid immiscible with an electrolytic droplet;

a distribution plate positioned within the chamber having an aperture therein, the distribution plate dividing the housing into upper and lower chambers;

a lower electrode positioned below the lower chamber and below the aperture in the distribution plate, the lower electrode being electrically insulated from the lower chamber and being separated from the lower chamber by an overlying hydrophobic layer;

an upper electrode located above the upper chamber and above the aperture of the distribution plate, the upper chamber electrode being electrically insulated from the upper chamber and being separated from the upper chamber by an underlying hydrophobic layer; and first, second and third voltage generators that are electrically connected to, respectively, the lower and upper electrodes and the distribution plate, the first, second and third second voltage generators being configured to apply electrical potentials thereto, thereby inducing movement of the electrolytic droplet between the hydrophobic layers of the upper and lower chambers.

2. The apparatus defined in claim 1, wherein the distribution plate comprises a conductive outer layer.

3. The apparatus defined in claim 1, wherein the first, second and third voltage generators are coincident.

4. The apparatus defined in claim 1, wherein the upper chamber hydrophobic layer is coated with a reactive substrate.

5. The apparatus defined in claim 4, wherein the reactive substrate is selected from the group consisting of: antibodies, receptors, ligands, nucleic acids, polysaccharides, and proteins.

6. An apparatus for inducing movement of an electrolytic droplet, comprising:

a housing having an internal volume filled with a liquid immiscible with an electrolytic droplet;

a distribution plate positioned within the chamber having an aperture therein, the distribution plate dividing the housing into upper and lower chambers;

a lower electrode positioned below the lower chamber and below the aperture in the distribution plate, the lower electrode being separated from the lower chamber by an overlying hydrophobic layer;

an upper electrode located above the upper chamber and above the aperture of the distribution plate, the upper chamber electrode being separated from the upper chamber by an underlying hydrophobic layer;

a plurality of adjacent, electrically isolated droplet manipulation electrodes positioned above the lower electrode and below the lower chamber hydrophobic layer, wherein sequential droplet manipulation electrodes have substantially contiguous, hydrophobic upper surfaces that define a droplet travel path, wherein one of the lower droplet manipulation electrodes is positioned below the aperture in the distribution plate;

first, second and third voltage generators that are electrically connected to, respectively, the lower and upper electrodes and the distribution plate, the first, second and third second voltage generators being configured to apply electrical potentials thereto, thereby inducing movement of the electrolytic droplet between the hydrophobic layers of the upper and lower chambers; and a fourth voltage generator that is electrically connected to the plurality of droplet manipulation electrodes and is configured to apply electrical potentials sequentially to the droplet manipulation electrodes along the droplet travel path, thereby inducing movement of the electrolytic droplet along the droplet travel path.

7. The apparatus defined in claim 6, wherein the distribution plate comprises a conductive outer layer.

8. The apparatus defined in claim 6, wherein the upper chamber hydrophobic surface is coated with a reactive substrate to form a reaction site.

9. The apparatus defined in claim 8, wherein the reactive substrate is selected from the group consisting of: antibodies, receptors, ligands, nucleic acids, polysaccharides, and proteins.

10. The apparatus defined in claim 6, further comprising an inlet fluidly connected with the bottom chamber that provides access thereto, the inlet being positioned above one of the plurality of lower chamber electrodes.

11. The apparatus defined in claim 6, wherein the upper hydrophobic layer is substantially transparent.

12. The apparatus defined in claim 6, wherein at least two adjacent ones of the plurality of droplet manipulation electrodes include noncontacting interdigitating projections in their adjacent edges.

13. The apparatus defined in claim 6, wherein the distribution plate includes a plurality of apertures, and wherein the upper chamber hydrophobic surface is coated in a plurality of locations with a reactive substrate to form a plurality of reaction sites, and each of the distribution plate apertures is substantially vertically aligned with a respective droplet manipulation electrode and a respective reaction site.

14. A method of moving an electrolytic droplet, comprising:

providing a housing having an internal volume and a distribution plate residing therein, the distribution plate having an aperture and dividing the internal volume into upper and lower chambers, the lower chamber including an electrolytic droplet and each of the upper and lower chambers containing a liquid immiscible with the electrolytic droplet, the housing including a lower electrode electrically insulated from the lower chamber and underlying a hydrophobic layer, and the housing further including an upper electrode electrically insulated from the upper chamber and overlying a hydrophobic lower layer;

positioning the electrolytic droplet above the lower electrode and beneath the distribution plate aperture; and applying electrical potentials to the lower and upper electrodes and to the distribution plate to draw the electrolytic droplet through the distribution plate aperture and to the upper chamber hydrophobic surface.

15. The method defined in claim 14, wherein the distribution plate is coated with a conductive material.

16. The method defined in claim 15, further comprising maintaining the electrolytic droplet in contact with the reaction site for a preselected duration sufficient to enable the reaction between the constituents of the electrolytic droplet and the reactive substrate to reach completion.

17. The method defined in claim 14, wherein the upper chamber hydrophobic surface is coated with a reactive substrate to form a reaction site, and wherein contact between the electrolytic droplet and the reaction site causes a reaction between constituents of the electrolytic droplet and the reactive substrate.

18. The method defined in claim 17, wherein the reactive substrate is selected from the group consisting of: antibodies, receptors, ligands, nucleic acids, polysaccharides, and proteins.

19. An apparatus for inducing movement of an electrolytic droplet, comprising:

a housing having an internal volume;

a plurality of adjacent, electrically isolated transport electrodes positioned in the housing, wherein sequential transport electrodes have substantially contiguous, hydrophobic surfaces, the transport electrodes defining a droplet travel path;

a first voltage generator electrically connected to the transport electrodes, the first voltage generator configured to apply electrical potentials sequentially to each transport electrode along the droplet travel path, thereby inducing movement of an electrolytic droplet along the travel path;

a plurality of gate electrodes, each of the gate electrodes positioned in the housing adjacent a respective transport electrode and having a hydrophobic surface that is substantially contiguous with the hydrophobic surface of the adjacent transport electrode, the gate electrodes being electrically connected;

a second voltage generator connected to the plurality of gate electrodes and configured to apply electrical potentials thereto;

a plurality of destination electrodes, each of which is positioned in the housing adjacent a respective gate electrode, each destination electrode having a hydrophobic surface that is substantially contiguous with the hydrophobic surface of the adjacent gate electrode; and a third voltage generator connected to the destination electrodes and configured to apply electrical potentials thereto.

20. A method of inducing movement in an electrolytic drop, comprising:

providing a device comprising:

a housing having an internal volume filled with a liquid immiscible with an electrolytic droplet;

a plurality of adjacent, electrically isolated transport electrodes positioned in the housing, wherein sequential transport electrodes have substantially contiguous, hydrophobic surfaces, the transport electrodes defining a droplet travel path;

a plurality of gate electrodes, each of the gate electrodes positioned in the housing adjacent a respective transport electrode and having a hydrophobic surface that is substantially contiguous with the hydrophobic surface of the adjacent transport electrode, the gate electrodes being electrically connected; and a plurality of destination electrodes, each of which is positioned in the housing adjacent a respective gate electrode, each destination electrode having a hydrophobic surface that is substantially contiguous with the hydrophobic surface of the adjacent gate electrode;

positioning an electrolytic droplet on a first transport electrode;

applying an electrical potential to a second transport electrode adjacent the first transport electrode sufficient to induce the electrolytic droplet to move from the first transport chamber electrode to the second transport electrode;

repeating the applying step to continue inducing movement of the electrolytic droplet between adjacent lower chamber electrodes along the droplet travel path to a predetermined transport adjacent a first gate electrode, wherein the first gate electrode is at a ground state;

applying an electrical potential to the first gate electrode as the predetermined transport electrode is at a ground state to induce the electrolytic droplet to move from the predetermined transport electrode to the first gate electrode, wherein a first destination electrode adjacent the first gate electrode is in a ground state; and applying an electrical potential to the first destination electrode as the first gate electrode is in a ground state to induce the electrolytic droplet to move from the first gate electrode to the first destination electrode.

21. The method defined in claim 20, further comprising contacting the electrolytic droplet with a reactive substrate after the electrolytic substrate moves to the first destination electrode.

22. The method defined in claim 21, wherein contacting the electrolytic droplet with a reactive substrate comprises contacting the electrolytic droplet to an electrode having a hydrophobic surface coated with the reactive substrate.

* * * * *